(12) United States Patent
Hines

(10) Patent No.: US 8,228,373 B2
(45) Date of Patent: Jul. 24, 2012

(54) 3-D CAMERA RIG WITH NO-LOSS BEAMSPLITTER ALTERNATIVE

(76) Inventor: Stephen P. Hines, Glendale, CA (US)

( * ) Notice: Subject to any disclaimer, the term of this patent is extended or adjusted under 35 U.S.C. 154(b) by 0 days.

(21) Appl. No.: 13/084,021

(22) Filed: Apr. 11, 2011

(65) Prior Publication Data

US 2011/0187833 A1  Aug. 4, 2011

Related U.S. Application Data

(63) Continuation-in-part of application No. 12/455,772, filed on Jun. 5, 2009, now Pat. No. 7,948,515.

(51) Int. Cl.
*H04N 13/02* (2006.01)
(52) U.S. Cl. ........................................ 348/47
(58) Field of Classification Search ....................... 348/47
See application file for complete search history.

(56) References Cited

U.S. PATENT DOCUMENTS 8,085,293 B2 * 12/2011 Brodsky et al. ................. 348/49
2007/0177011 A1 * 8/2007 Lewin et al. .................. 348/118

* cited by examiner

*Primary Examiner* — Jayanti K Ptel
*Assistant Examiner* — Richard Torrente
(74) *Attorney, Agent, or Firm* — Roy L. Anderson; Wagner, Anderson & Bright, PC

(57) ABSTRACT

A direct view camera with a direct view lens is mounted to a support to obtain a direct view camera shot while a reflected view camera with a reflected view lens is mounted to the support to obtain a reflected view camera shot without use of a beamsplitter. Interaxial spacing between the direct view and reflected view cameras does not cause an overlap between a direct view active optical area of the beamsplitter that would be used by the direct view lens and a reflected view active optical area of the beamsplitter that would be used by the reflected view lens. A reflective planar mirror is positioned to reflect light from a surface of the reflective planar mirror to the reflected view lens while a transparent planar glass is positioned to allow light to pass substantially perpendicularly through the transparent planar glass to the direct view lens.

10 Claims, 14 Drawing Sheets

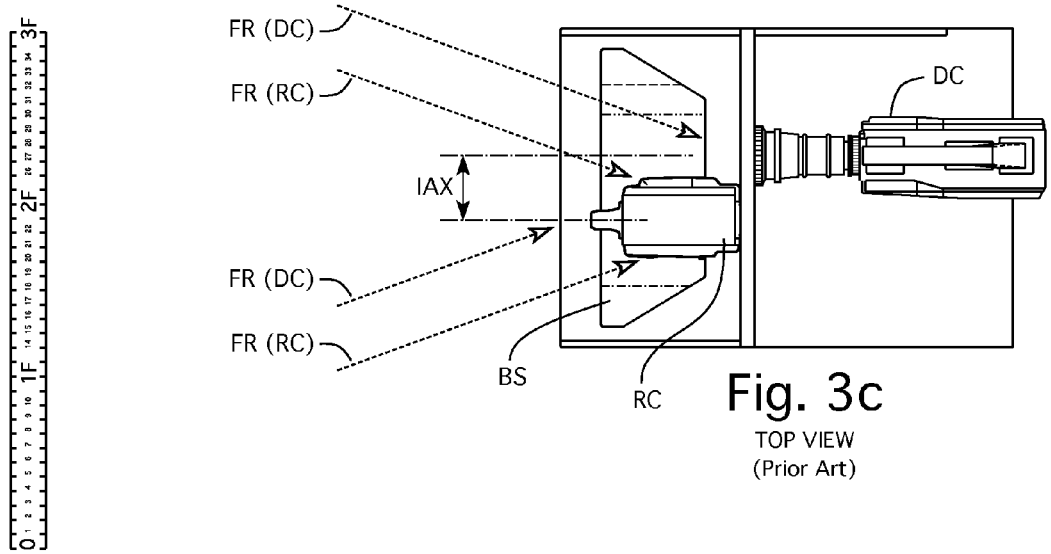
Fig. 3c
TOP VIEW
(Prior Art)
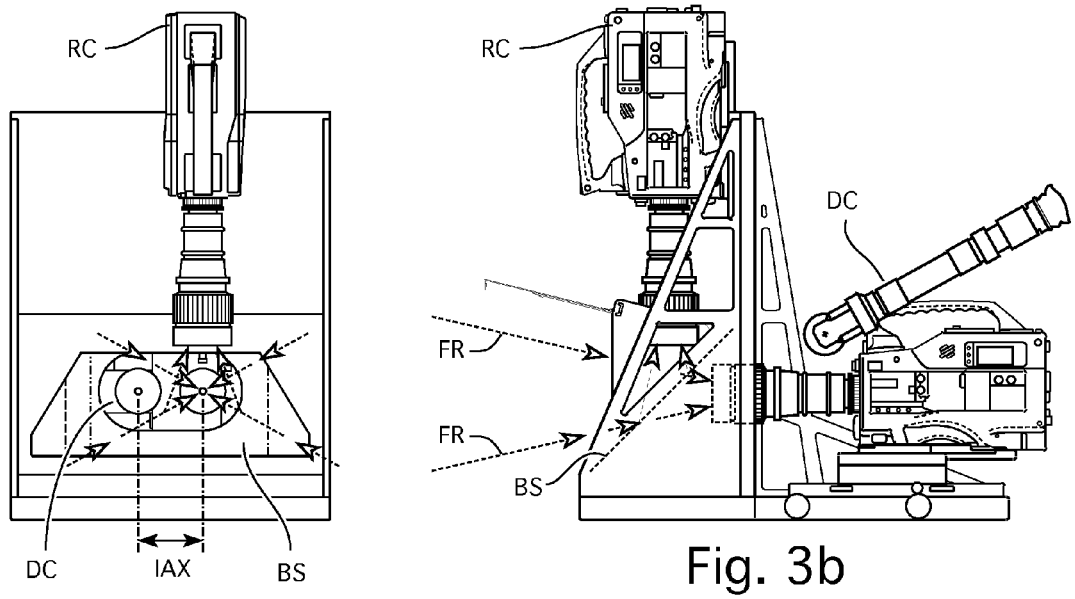
Fig. 3a
FRONT VIEW
(Prior Art)
Fig. 3b
SIDE VIEW
(Prior Art)

1/2" INTERAXIAL

1/2" INTERAXIAL 2-1/2" INTERAXIAL 2-1/2" INTERAXIAL 4-1/2" INTERAXIAL 4-1/2" INTERAXIAL

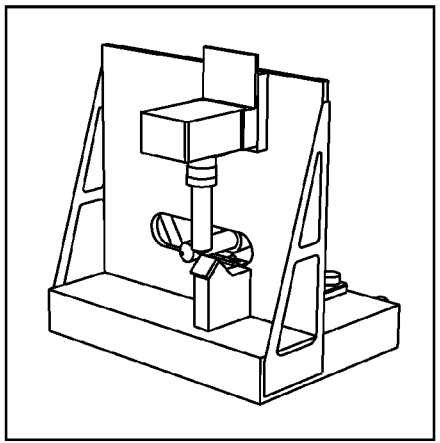
Fig. 5a, CONVERGED ON FRONT CORNER
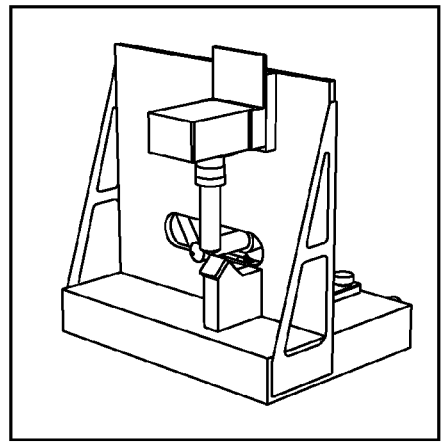
Fig. 5a, CONVERGED ON FRONT CORNER
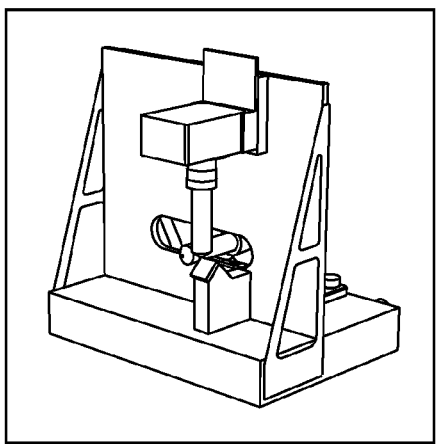
Fig. 5b, CONVERGED IN MIDDLE
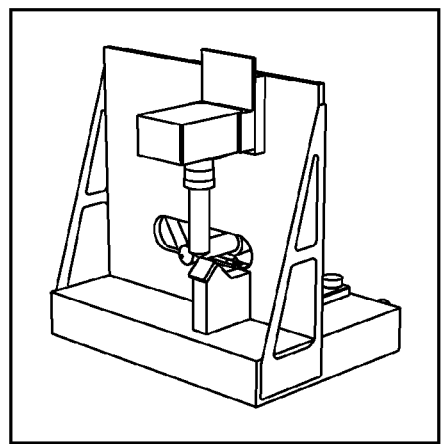
Fig. 5b, CONVERGED IN MIDDLE
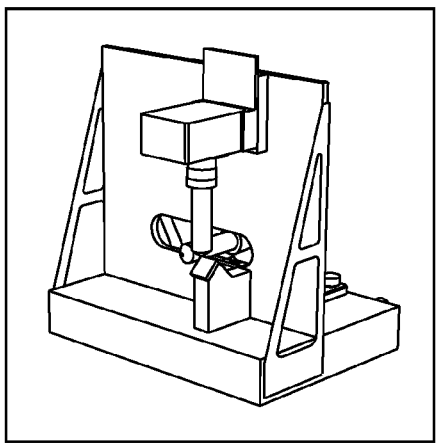
Fig. 5c, CONVERGED FARTHER BACK
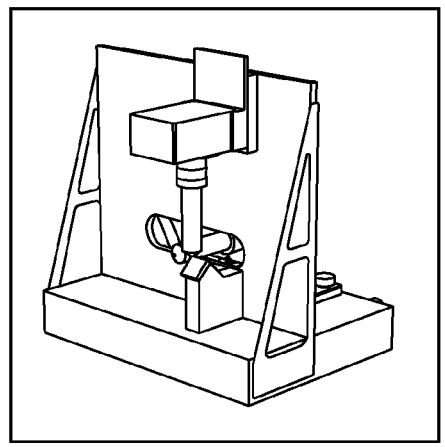
Fig. 5c, CONVERGED FARTHER BACK Video Camera Lens 65mm-Format Movie Camera Lens (Prior Art)

35mm-Format Movie Camera Lens
(Prior Art)

CCTV Camera Lens

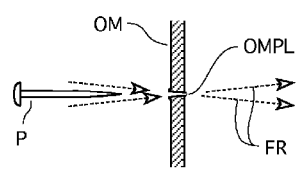
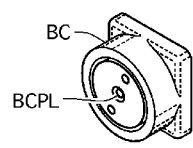
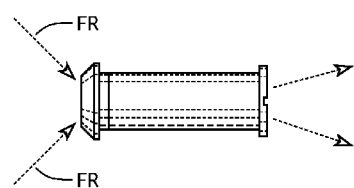
Fig. 10  Fig. 11  Fig. 13
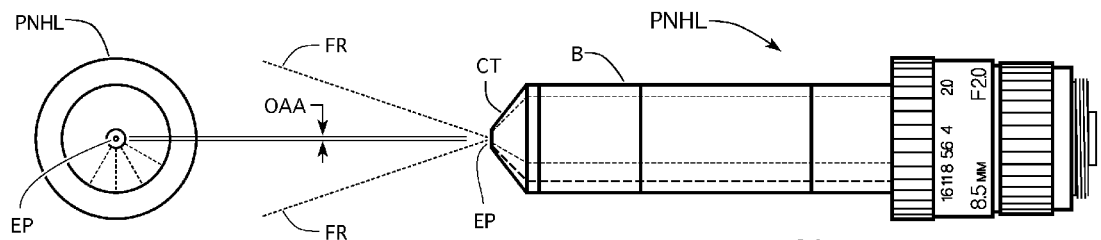
Fig. 12a  Fig. 12b

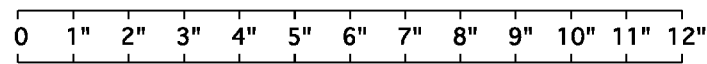
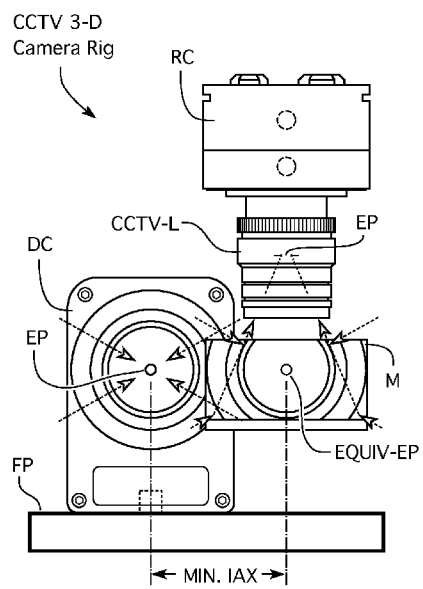
Fig. 14a
FRONT VIEW
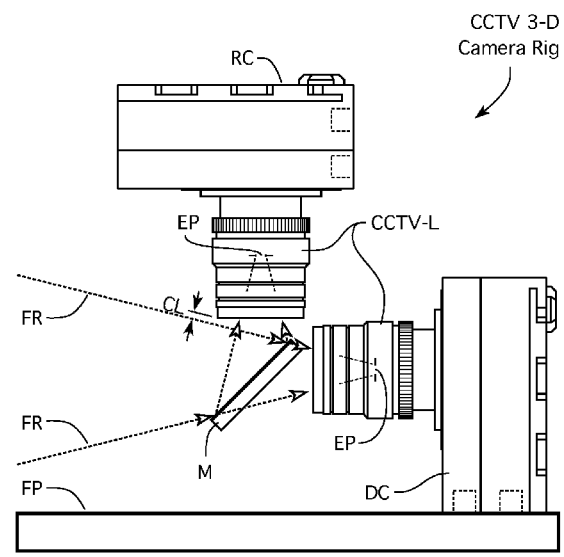
Fig. 14b
SIDE VIEW

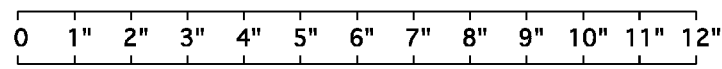
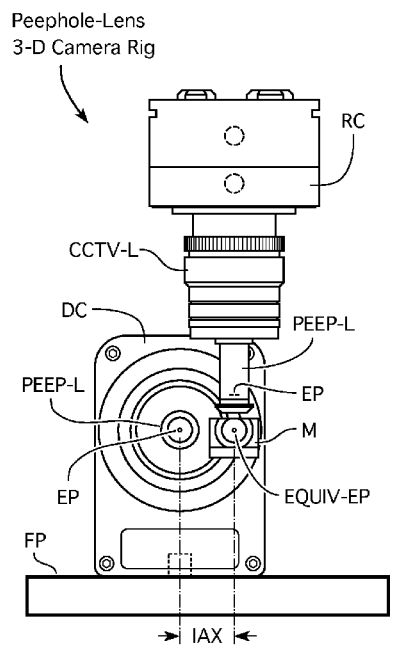
Fig. 15a
FRONT VIEW
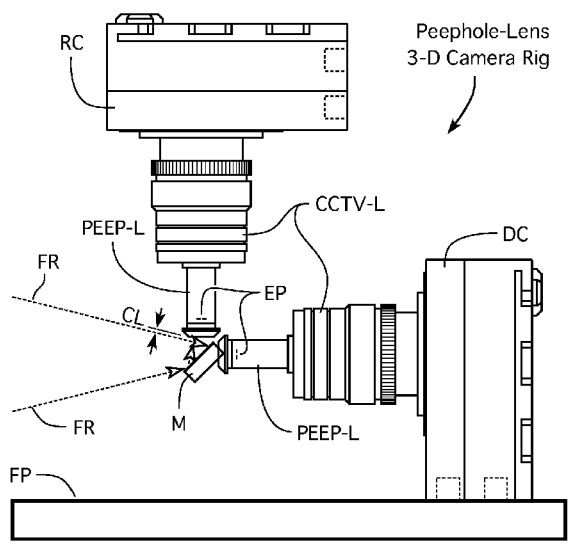
Fig. 15b
SIDE VIEW

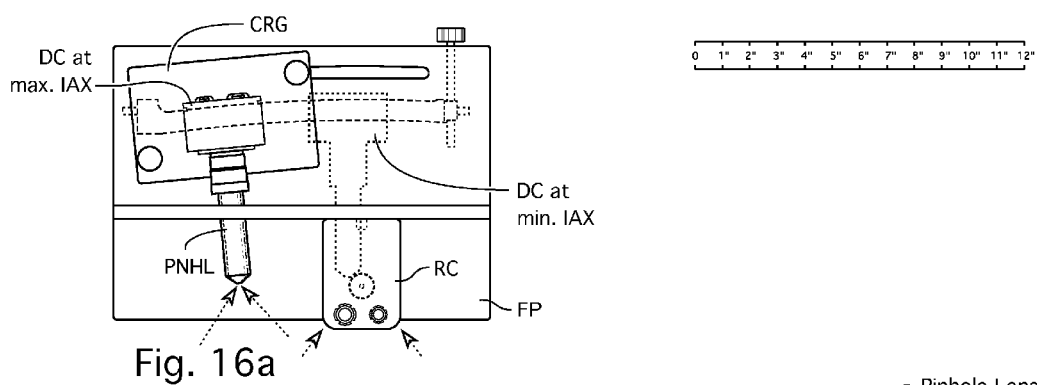
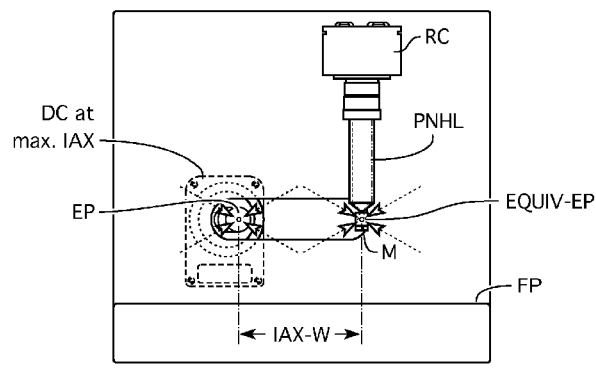
Fig. 16a
Fig. 16b
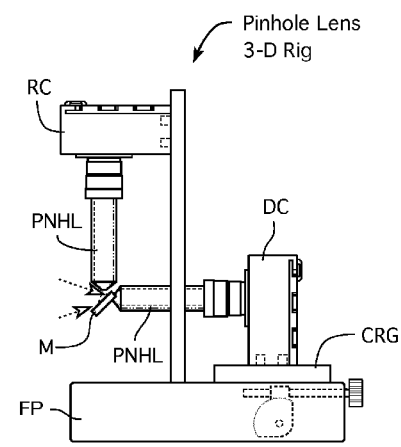
Fig. 16c

3-D CAMERA RIG WITH NO-LOSS BEAMSPLITTER ALTERNATIVE

NOTICE OF RELATED APPLICATIONS

The present application is a continuation-in-part application of U.S. Ser. No. 12/455,772, filed Jun. 5, 2009 now U.S. Pat. No. 7,948,515, the disclosure of which is specifically incorporated herein by reference.

FIELD OF THE INVENTION

The present invention is in the field of cameras mounted in a rig useful for three-dimensional (3-D), i.e. stereoscopic photography.

BACKGROUND OF THE INVENTION

The production of three-dimensional photographs, both cine and still, is well known in the art and usually involves the use of two cameras which record the same scene from slightly different positions. Typically, the nominal effective lateral displacement between the respective optical axes of the cameras, known as the interaxial spacing, is approximately equal to the average spacing between the eyes of a viewer (i.e. about 2.5 inches). This spacing would produce the same 3-D effect as that perceived by a viewer who viewed the scene from the camera location. A greater or lesser interaxial spacing is sometimes desirable to produce greater or lesser stereoscopic depth. Hence, conventional 3-D camera systems commonly include some means for adjusting the position of one camera relative to the other to vary the interaxial spacing over a continuous range from zero to about 4 or 5 inches.

FIGS. 4a-c are stereoscopic-pair drawings to show the change on stereoscopic depth of a scene as a result of increasing the interaxial spacing (using a 3-D camera rig of this invention as the subject of the drawings). These stereo drawings are intended to be free viewed, with the left images on the left, right images on the right (not cross eyed). When viewed in 3D, FIG. 4a shows the stereoscopic depth as if photographed with a 0.5-inch interaxial spacing. FIG. 4b shows the same subject as if photographed with a 2.5-inch spacing (equal to the distance between our eyes, and therefore more normal depth). FIG. 4c shows exaggerated stereo depth as if photographed at 4.5-inch interaxial spacing. Interaxial adjustment is one of two primary controls that a stereographer needs to shoot a 3-D movie (the other adjustment being the convergence distance, see FIG. 5).

Aside from interaxial spacing adjustment, the off-screen position of images can also be controlled by varying the convergence distance at which the optical axes of the respective 3-D camera lenses intersect. When 3-D images are projected for viewing, such convergence distance determines the distance at which objects within the scene appear to be located front-to-back relative to the projection screen. When the convergence angle is such that the camera axes intersect at, say, thirty feet in front of the cameras, objects closer and farther will appear to a viewer to be positioned in front of and behind the screen, respectively. Special well known 3-D effects can be achieved in 3-D motion picture photography by varying the convergence distance during filming, and conventional 3-D camera systems commonly include means for adjusting the convergence distance of the lens axes of the two cameras to vary such distance over a continuous range between infinity and about four feet measured from the camera.

FIGS. 5a-c are stereoscopic-pair drawings with a fixed amount of stereoscopic depth, or amount of 3D, using a 2.5-inch interaxial spacing, however showing the effect of changing the convergence distance. For reference, any object photographed at the convergence distance (the distance where the two camera lens axes intersect in space) will be seen by the audience on the surface of the theater screen. Objects farther than the convergence distance will appear farther, behind the screen. Objects closer than the convergence will appear closer than the screen, floating out toward the audience. It is important for 3-D camera rigs to provide the ability to change convergence distance to allow the camera operator to push and pull the image in or out of the screen. FIG. 5a is drawn as if the right and left cameras converged on the front corner of the object. This places the image at the screen plane (or the plane of the paper) and behind. FIG. 5b is drawn with "cameras" converged at an intermediate depth in the scene, so that the front part of the image comes off the paper, and the back part recedes into the paper. FIG. 5c is drawn with the convergence distance at the back of the scene, so that the entire image protrudes off the paper.

There are three basic approaches to stereoscopic or 3-D photography.

The most basic approach for stereoscopic or 3-D photography has been done with single-lens adapters. The primary advantage of this approach is that it is simple because it uses a single camera, reducing the cost. The disadvantages of this approach are that the interaxial spacing is fixed, restricted by the size of the lens, and frequently the convergence distance is fixed. The left and right images are squeezed onto a single frame of film, compromising the image quality.

Another way stereoscopic or 3-D photography has been done is with side-by-side cameras as illustrated in FIG. 1 in which a 1-foot long ruler is shown for reference. The advantages of this approach are no light loss to the cameras, compared to beamsplitter rigs, and that such rigs are simple and inexpensive. The disadvantage of this approach is that the minimum interaxial spacing can be no less than the width of the camera. For example, Panavision 35 mm film cameras are approximately 10.5 inches wide, although some new video cameras are as narrow as 3 inches. However, even a 3-inch interaxial spacing is too wide for most shots. Therefore, side-by-side rigs are not practical for most 3-D work.

A third way stereoscopic or 3-D photography has been done is with beamsplitter rigs as illustrated in FIGS. 2a-c. FIG. 2a shows the laterally adjustable camera DC parallel to (no convergence) and beside the optically equivalent position of the stationary camera RC. Camera DC is spaced laterally at an interaxial spacing IAX from the optically equivalent position of stationary camera RC. The camera lens axes are parallel and are considered to converge at infinity. FIG. 2b shows the direct camera DC at the same lateral position (interaxial spacing) as in FIG. 2a; however, toed in at a slight angle so that the lens center line converges with stationary camera RC at a distance, less than infinity but outside of the left side of the drawing. FIG. 2c shows the direct camera DC at the same angle as in FIG. 2b; however at a reduced interaxial spacing.

The advantages of using a beamsplitter rig are that the laterally-adjustable camera DC can be in a position that would otherwise mechanically interfere with the fixed camera RC providing a minimum interaxial spacing of as little as 0.0 inches. Disadvantages are the 50% light loss to both cameras from the beamsplitter, the large size of the beamsplitter required due to the horizontal field of view of the cameras, and the difficulty of rigidly mounting the thin glass beamsplitter supported on its bottom edge. The large size beamsplitter is required because the camera lens sees the scene as a wider-than-high rectangle in front of the camera. Light from the scene converges into the lens and passes through the lens' entrance pupil, well inside the lens, where the bundle of light rays are at their smallest diameter.

FIGS. 6-9 show a variety of conventional camera lenses, drawn at the same scale, used in the motion picture and television industries. In all cases, note the position of the entrance pupils EP being well inside the lens barrels at a distance of DEP, and the optically active area OAA at the front of the lenses, required if a mirror or beamsplitter is used in a 3-D rig application. Because traditional lenses used in the motion picture industry are physically large, and have the entrance pupil inside the lens barrel, and because the beamsplitter must be located out in front of the lens by several inches, a sizeable portion of the beamsplitter is required to cover the image as it passes through, or is reflected off of, the beamsplitter. The physical scale of the cameras, lenses and beamsplitter limits how small a beamsplitter-type 3-D camera rig can be.

Because traditional lenses used in the motion picture industry are physically large, and have the entrance pupil inside the lens barrel, and because the beamsplitter must be located out in front of the lens by several inches, a sizeable portion of the beamsplitter is required to cover the image as it passes through, or is reflected off of, the beamsplitter. The physical scale of the cameras, lenses and beamsplitter limits how small a beamsplitter-type 3-D camera rig can be.

FIGS. 3a-c show a state-of-the art dual-camera beamsplitter 3-D rig fitted with video cameras. The physical size of the cameras and lenses, and lens field of view and position of entrance pupil deep in the lens causes the rig to be rather large. A 3-foot ruler is included for reference. The advantages of this approach are the narrow rig with wide-angle lenses, rigid structure, that the cameras interaxial spacing can be adjusted to as little as 0.0 inches. The disadvantages are the physical size of the rig, the weight, and the light loss due to the 50/50 beamsplitting mirror.

The ease of use of rigs used in stereoscopic or 3-D photography today is limited by physical size limitations or compromises in versatility and adaptability that are not generally acceptable. Accordingly, there has been a long felt need in 3-D photography for new and improved rigs that are smaller, lighter and easier to use while still permitting interaxial spacing and/or convergene distance adjustments desired by film-makers.

SUMMARY OF THE INVENTION

The present invention is generally directed to an apparatus and method for stereoscopic photography in which a direct view camera with a direct view lens is mounted to a support to obtain a direct view camera shot while a reflected view camera with a reflected view lens is mounted to the support in a down-looking camera configuration to obtain a reflected view camera shot without use of a beamsplitter when an interaxial spacing between the direct view camera and the reflected view camera does not cause an overlap between a direct view active optical area of the beamsplitter that would be used by the direct view lens and a reflected view active optical area of the beamsplitter that would be used by the reflected view lens.

In a first, separate group of aspects of the present invention, there are various ways to obtain the reflected view camera shot without use of a beamsplitter. A planar mirror can be positioned to (substantially fully) reflect light from a surface of the reflective planar mirror to the reflected view lens while a transparent planar glass is positioned to allow light to pass substantially through the transparent planar glass to the direct view lens, both the transparent planar glass and reflective planar mirror having substantially parallel surfaces and being integral or not. Alternatively, the transparent planar glass can be eliminated and a spacer used to adjust the mounting of the direct view camera to the support so as to restore a sight line for the direct view camera. In still other alternatives, either one or both of the direct and reflected view lenses can be replaced with a pinhole lens.

In a second, separate group of aspects of the present invention, a stereoscopic photograph is obtained by use of a pair of cameras, at least one of which has a pinhole lens, in which an interaxial spacing between the pair of cameras can be varied so as to increase or decrease an amount of stereoscopic depth of the stereoscopic photograph and wherein a convergence distance between an intersection of the lens axes of the pair of cameras can be varied so as to control an off-screen position of a subject captured in the stereoscopic photograph. A substantially fully-reflective mirror can be positioned along an axis of the second pinhole lens such that the position of an entrance pupil of the second camera is at the optically equivalent vertical and longitudinal position of an entrance pupil of the first camera and the mirror position can be aligned by use of one or more LEDs.

It is therefore an object of the present invention to provide an improved camera rig useful for three-dimensional (3-D) photography.

These and further objects and advantages will be apparent to those skilled in the art in connection with the drawings and the detailed description of the invention set forth below.

BRIEF DESCRIPTION OF THE DRAWINGS

FIGS. 3a-c show a state-of-the art dual-camera beamsplitter 3-D prior art rig fitted with video cameras.

FIGS. 5a-c are stereoscopic-pair drawings with a fixed amount of stereo depth, or amount of 3D, using a 2.5-inch interaxial spacing, however showing the effect of changing the convergence distance.

FIG. 10 is the original pinhole "lens" made by punching a straight pin or needle through black cardboard to make a pinhole camera.

FIG. 11 is a board-level camera from approximately 0.75 to 0.25 inch square, mounted to an electrical circuit board to be integrated into security surveillance cameras and cell phones.

FIG. 12 is the type of pinhole lens utilized in an especially preferred embodiment of the present invention.

FIG. 13 is a door peephole lens, not an image-forming lens, but rather an afocal wide-angle lens adapter.

FIGS. 14*a-b* are of a dual camera 3-D rig using a fully reflective mirror and cameras fitted with compact lenses CCTV-L.

FIGS. 15*a-b* are of a dual camera 3-D rig using a fully-reflective first-surface mirror and cameras fitted with compact lenses CCTV-L and peephole lenses PEEP-L.

FIGS. 16*a-c* are of a compact dual-camera 3-D rig, a subject of one preferred embodiment of this invention, which makes use of pinhole lenses PNHL, of FIG. 12*b*, and mirror M.

FIG. 21 is orthogonal to the view of FIG. 20.

DESCRIPTION OF THE INVENTION

In the Figures and the following description, letter designations indicate various features of the invention, with like letter designations referring to like features throughout both the drawings and the description. Although the Figures are described in greater detail below, the following is a glossary of the elements identified in the Figures.

Figure 1:
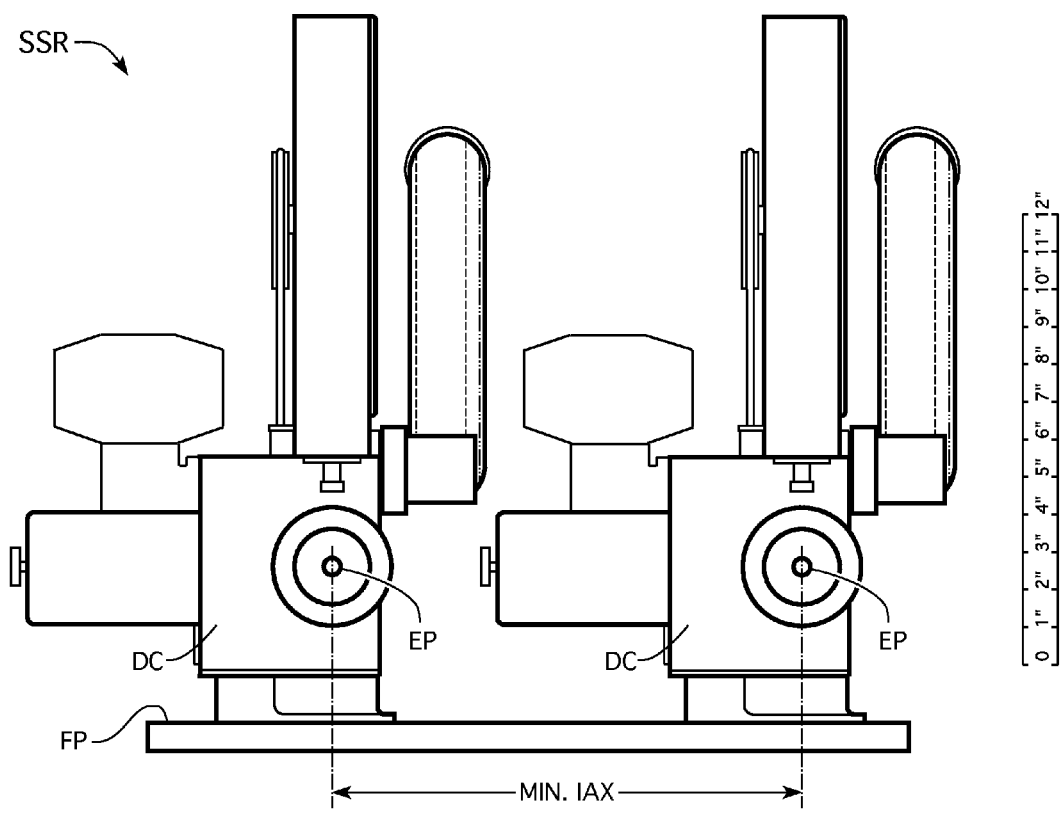
FIG. 1 is a front view of a simple dual-camera 3-D prior art rig comprised of two side-by-side 35 mm film cameras DC viewing the scene directly, spaced as closely as practical.
Figure 2A:
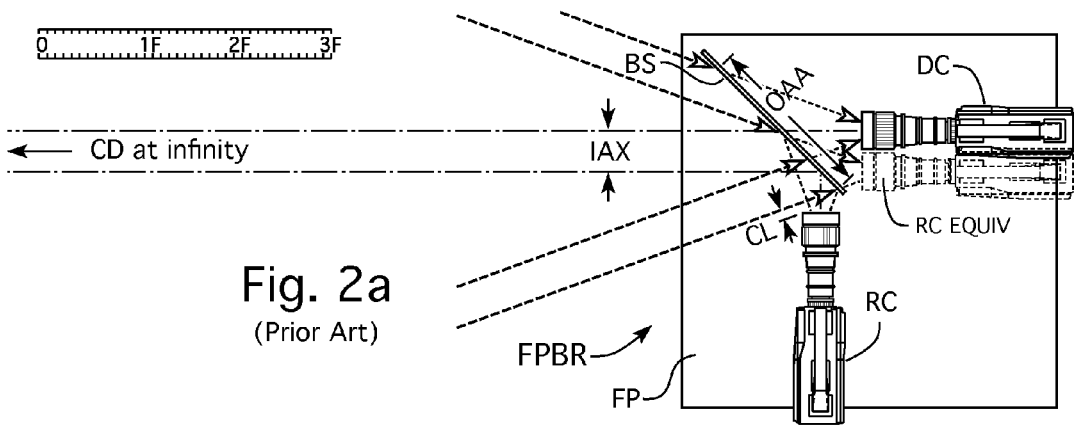
FIGS. 2a-2c show a top plan view of a typical flat-plate beamsplitter 3-D prior art rig FPBR, showing a stationary camera RC seeing an image reflected off of a beam-splitting mirror BS, and a laterally-adjustable camera DC taking the image transmitted through the vertically mounted beamsplitter BS.
Figure 2B:
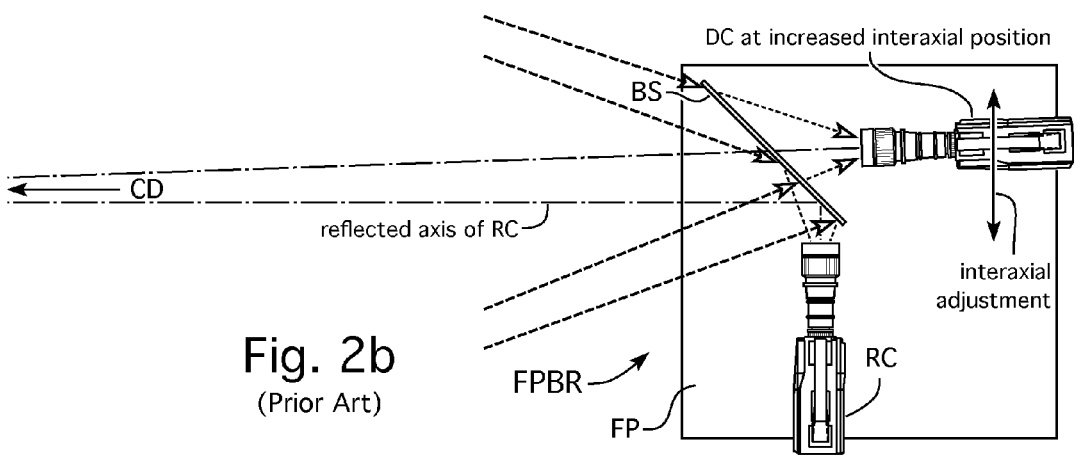
Figure 2C:
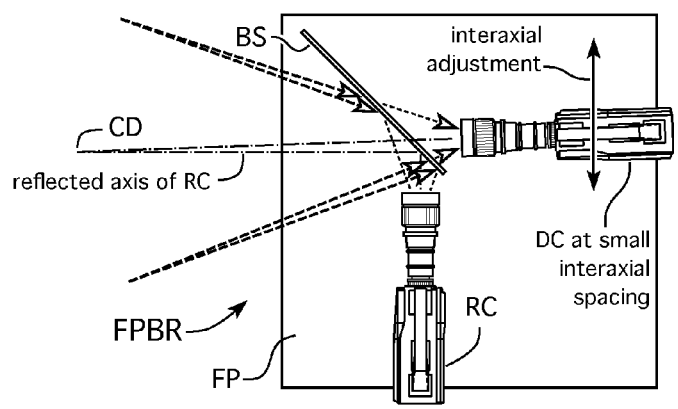
Figure 4A:
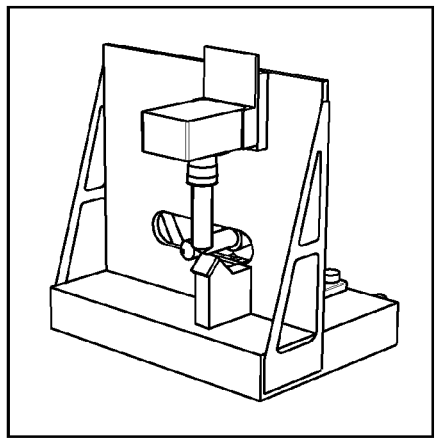
FIGS. 4a-c are stereoscopic-pair drawings to show the change on stereoscopic depth of a scene as a result of altering the interaxial spacing.
Figure 4A:
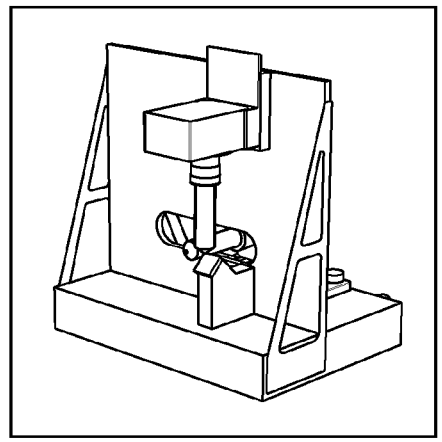
Figure 4B:
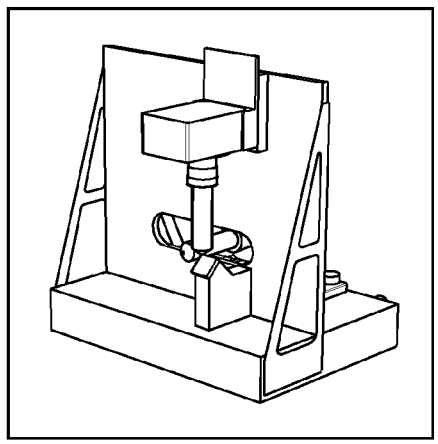
Figure 4B:
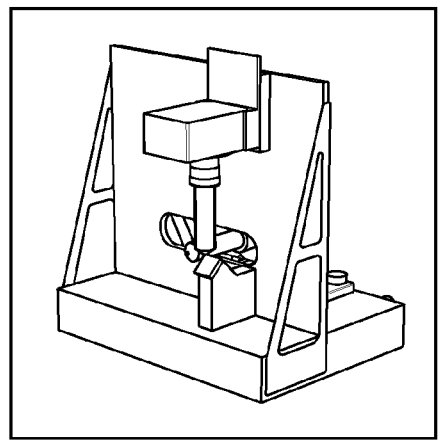
Figure 4C:
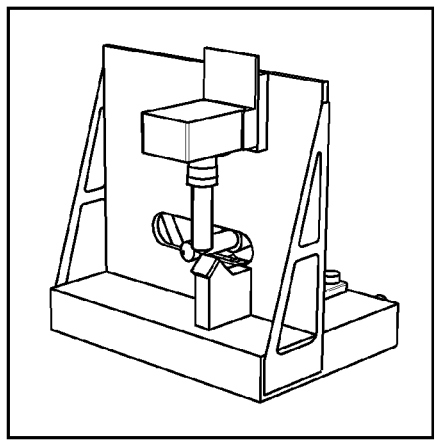
Figure 4C:
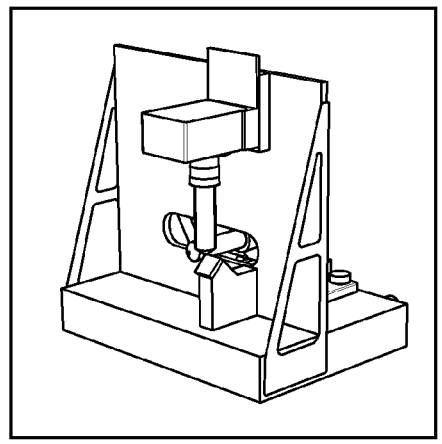
Figure 6:
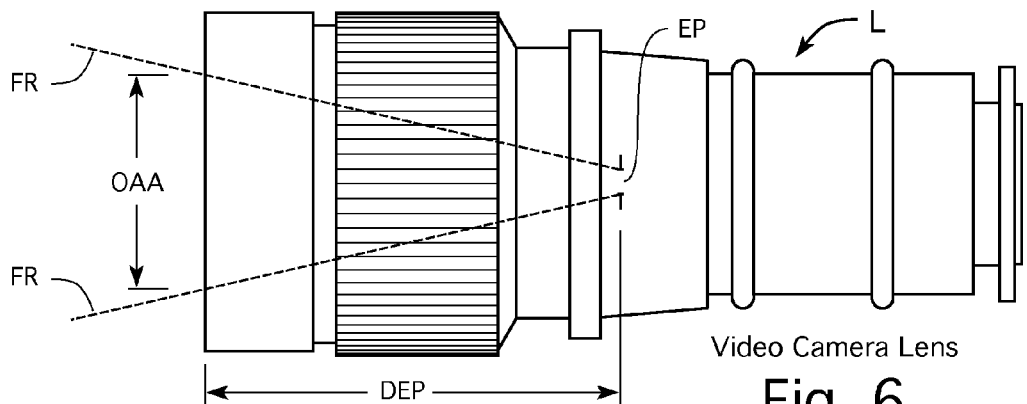
FIG. 6 is a zoom prior art lens of a type sold by Fujinon and Canon used on video cameras, for example on the Sony HDW-F900 video camera.
Figure 7:
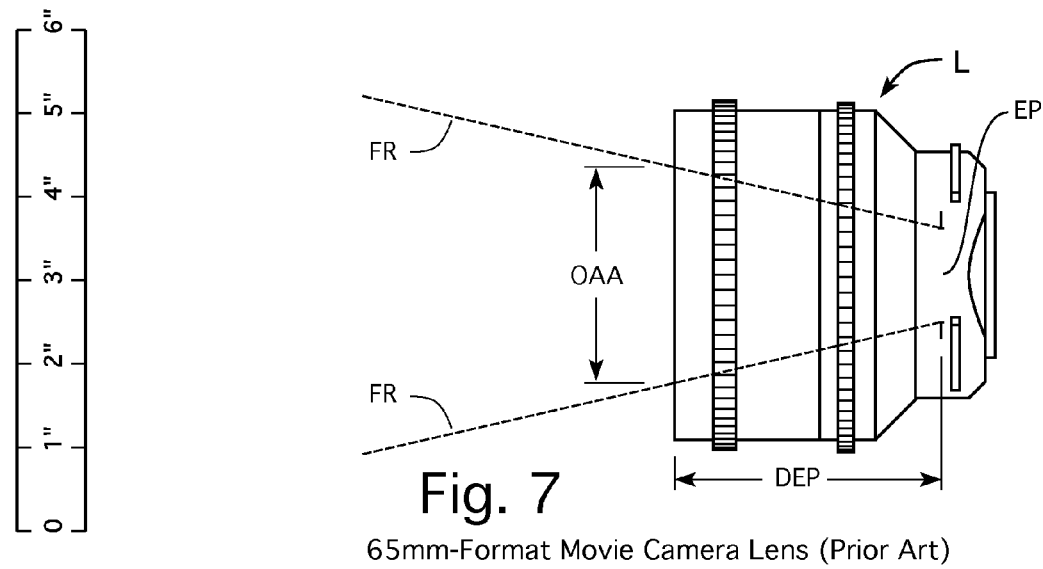
FIG. 7 is a primary (non-zoom) prior art lens used on a 65 mm-format movie camera.
Figure 8:
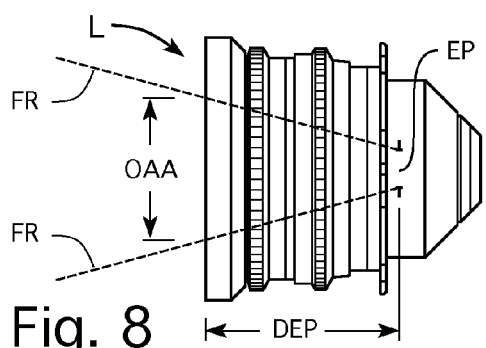
FIG. 8 is a prime prior art lens used on an Arriflex 35 mm-format movie camera.
Figure 9:
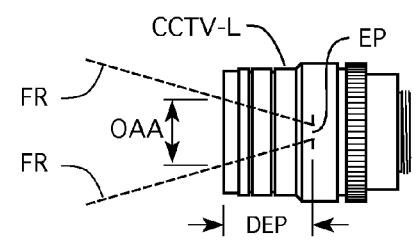
FIG. 9 is a compact C-mount prior art lens originally made inexpensively for CCTV cameras for video surveillance in stores; however, recently higher quality lenses in this format have been made for high-definition video cameras, for example for the Silicon Imaging SI-2K MINI camera.
Figure 17:
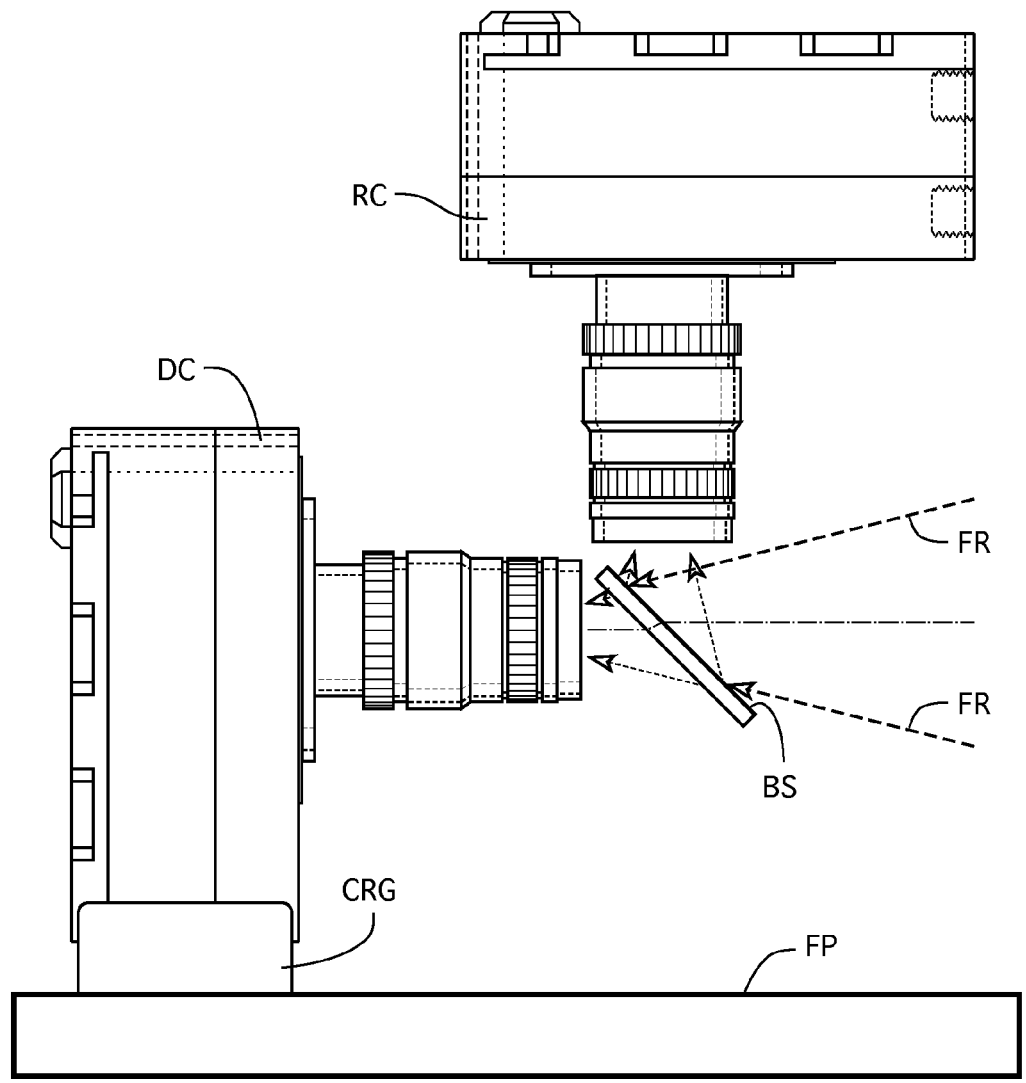
FIG. 17 is a side view illustration of a 3-D camera rig which is using a beamsplitter.
Figure 18:
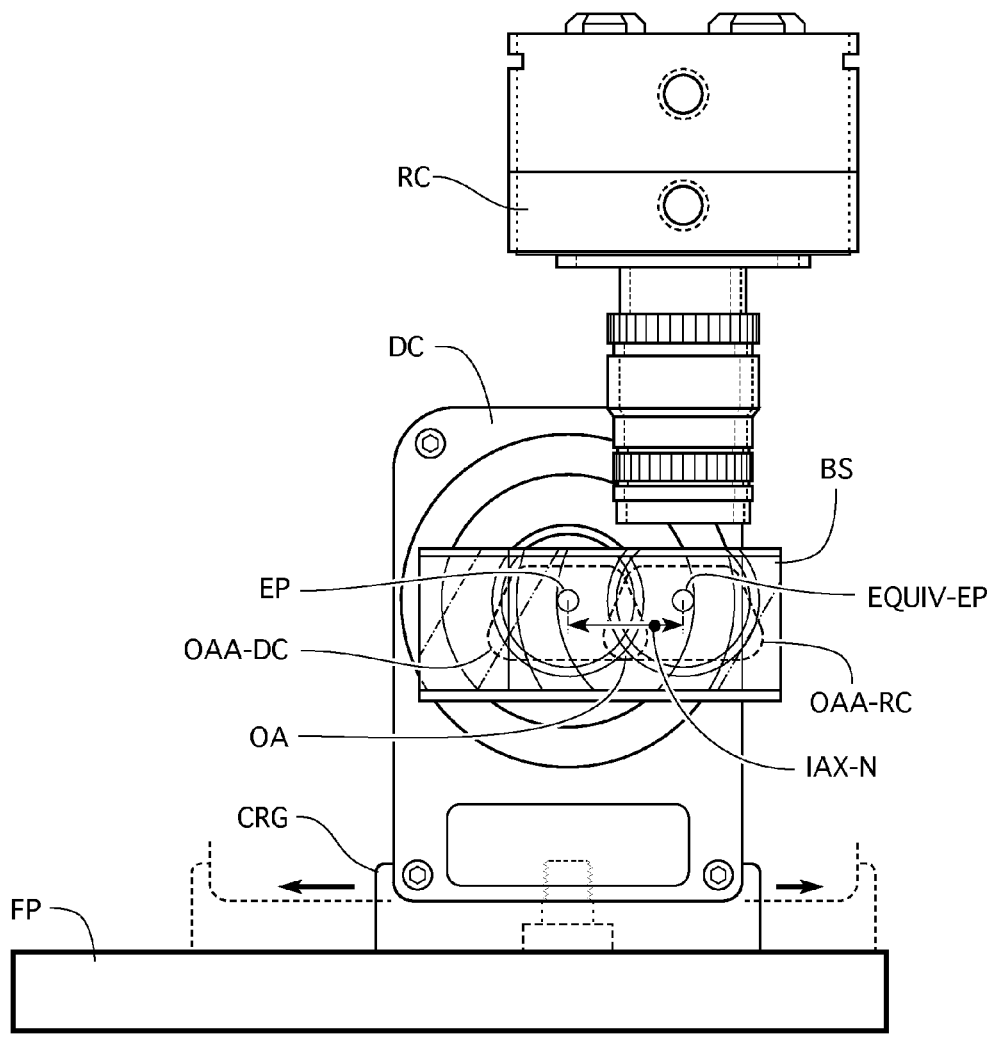
FIG. 18 is the front view of the 3-D camera rig of FIG. 17 to illustrate how the areas of the beamsplitter used by the two lenses overlap each other.
Figure 19:
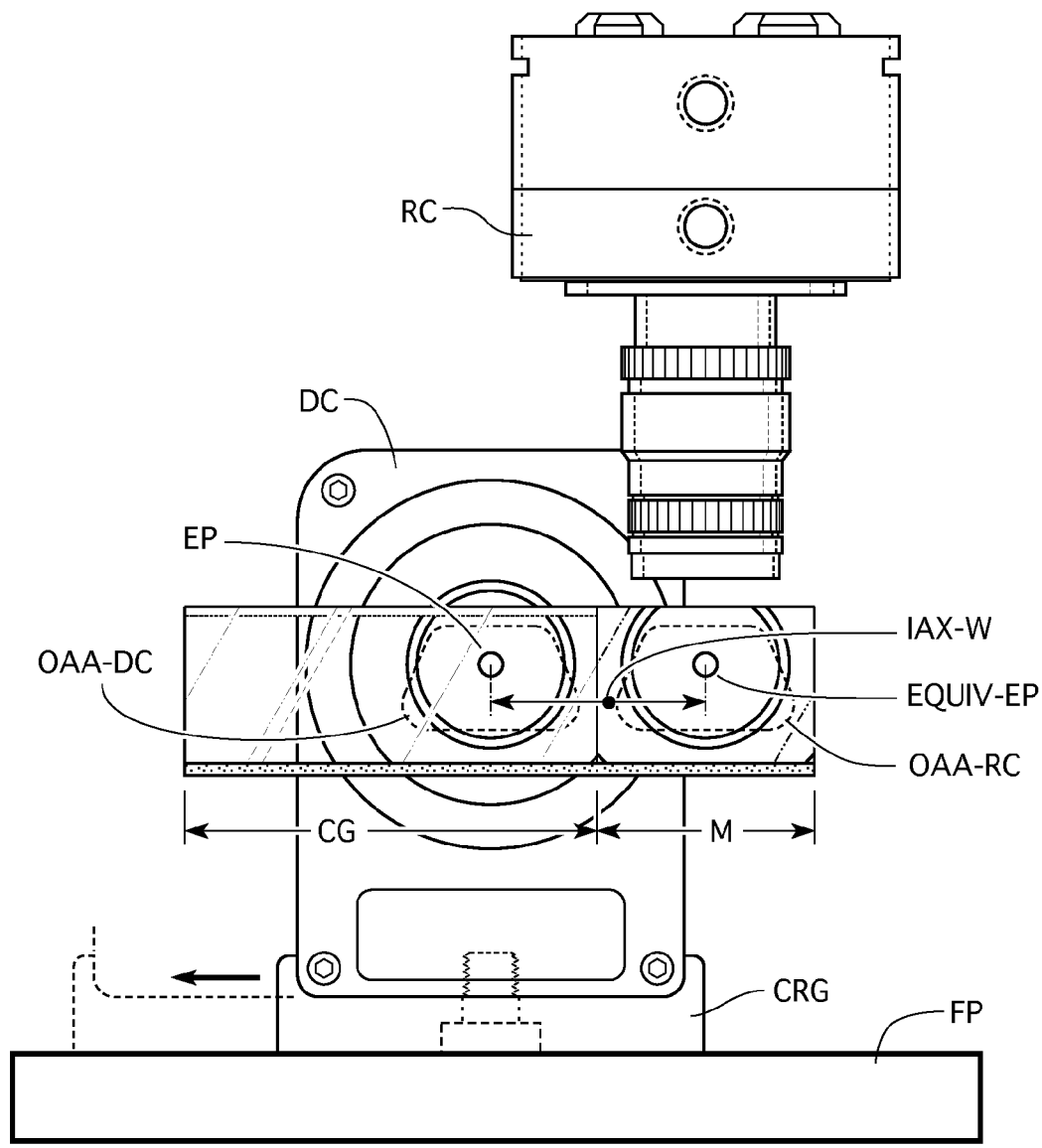
FIG. 19 illustrates a wider interaxial spacing than FIG. 18 in which the areas used by the two lenses no longer overlap each other and the beamsplitter of FIG. 18 has been replaced by an integral component of clear glass CG and a mirror M according to one preferred embodiment of the present invention.
Figure 22:
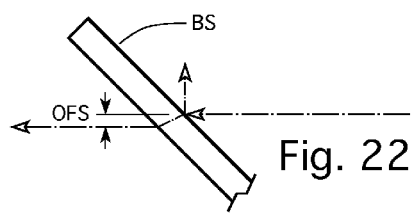
Figure 20:
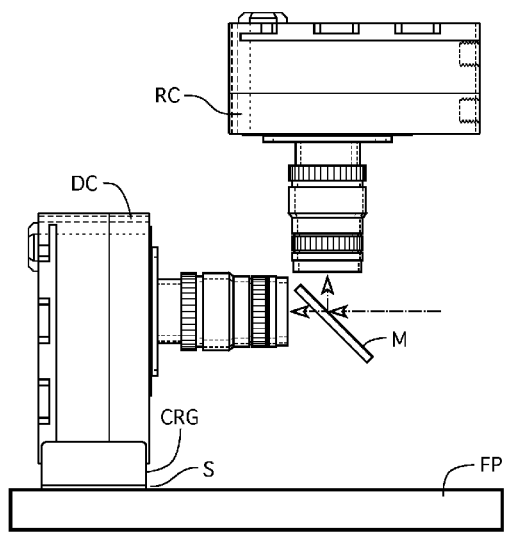
FIGS. 20-21 illustrate an alternative preferred embodiment of the present invention in which the clear glass component of FIG. 19 has been removed and a spacer S has been used to compensate for the offset caused by the removal of the beamsplitter shown in FIG. 22.
Figure 21:
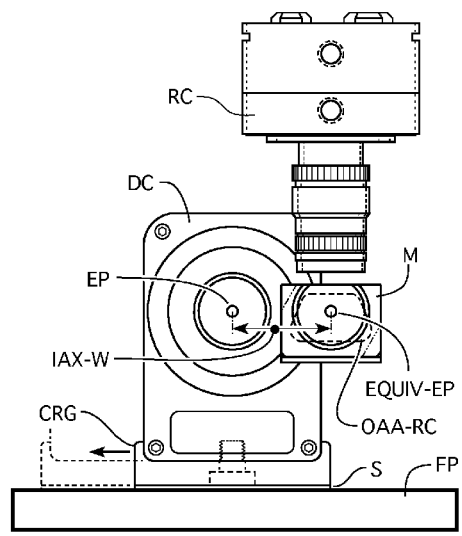

| | |
|---|---|
| B | Lens Barrel, FIG. 12b. |
| BC | Board Camera, FIG. 11. |
| BCPL | Board Camera Pinhole Lens, FIG. 11. |
| BS | Beamsplitter, beam-splitting mirror, FIGS. 2a, 2b, 2c, 3a, 3b, 3c, 17, 18, 22. |
| CCTV-L | Compact Lens, typically used on closed-circuit television cameras, FIGS. 14a, 14b, 15a, 15b. |
| CD | Convergence Distance, FIGS. 2a, 2b, 2c. |
| CG | Clear Glass, FIG. 19. |
| CL | Clearance between lens and field ray to keep one camera lens from seeing the other lens, or a reflection of its own lens, FIGS. 2a, 14b, 15b. |
| CRG | Carriage for movable camera, FIGS. 16a, 16c, 17, 18, 19, 20, 21. |
| CT | Conical Tip, on pinhole lens barrel, FIG. 12b. |
| DC | Direct-View Camera, FIGS. 1, 2a, 2b, 2c, 3a, 3b, 3c, 14a, 14b, 15a, 15b, 16a, 16b, 16c, 17, 18, 19, 20, 21. |
| DEP | Depth of Entrance Pupil behind front of lens, FIGS. 6-9. |
| EP | Entrance Pupil, FIGS. 1, 6-9, 12a, 12b, 14a, 14b, 15a, 15b, 18, 19, 21. |
| EQUIV EP | Equivalent position of Entrance Pupil, FIGS. 14a, 15a, 18, 19, 21. |
| F | Flat Plate, FIGS. 1, 2a, 2b, 2c, 14a, 14b, 15a, 15b, 16a, 16b, 16c, 17, 19-21. |
| FPBR | Flat Plate Beamsplitter Rig, FIGS. 2a, 2b, 2c. |
| FR | Field Rays, FIGS. 3b, 3c, 6-10, 12b, 13, 14b, 15b, 17. |
| FR (DC) | Field Rays of the Direct Camera, FIG. 3c. |
| FR (RC) | Field Rays of the Reflected Camera, FIG. 3c. |
| IAX | Interaxial Spacing, FIGS. 2a, 3a, 3c, 15a. |
| IAX-N | Narrow-Interaxial Spacing, FIG. 18. |
| IAX-W | Wide-Interaxial Spacing, FIGS. 16b, 19, 21. |
| L | Lens, FIGS. 6-8. |
| M | Fully-reflective Mirror, FIGS. 14a, 14b, 15a, 15b, 16b, 16c, 19, 20, 21. |
| MIN. IAX | Minimum Interaxial Spacing, FIGS. 1, 14a. |
| OA | Overlapping Areas, FIG. 18. |
| OAA | Optically Active Area (of lens, or beamsplitter or flat glass) needed to cover field of view, FIGS. 2a, 6, 7, 8, 9. |
| OAA-DC | Optically Active Area of beamsplitter needed to cover field of view of the forward-looking Direct Camera, FIGS. 18, 19. |
| OAA-RC | Optically Active Area of beamsplitter needed to cover field of view of the Reflected Camera, FIGS. 18, 19, 21. |
| OFS | Offset, FIG. 22. |
| OM | Opaque Material (typically cardboard), FIG. 10. |
| OMPL | Opaque-Material Pinhole Lens, FIG. 10. |
| PEEP-L | Peephole Lens, FIGS. 15a, 15b. |
| P | Pin, FIG. 10. |
| PNHL | Pinhole Lens, FIGS. 12a, 12b, 16a, 16b, 16c. |
| RC | Reflected Camera, FIGS. 2a, 2b, 2c, 3a, 3b, 3c, 14a, 14b, 15a, 15b, 16a, 16b, 16c, 17-21. |
| RC EQUIV | Equivalent position of Reflected Camera, FIG. 2a. |
| S | Spacer, FIGS. 20, 21. |
| SSR | Side-by-Side 3-D camera rig, FIG. 1. |

The present invention is directed to a dual-camera 3-D rig that achieves superior results compared to existing 3-D rigs because it does not require the use of a beamsplitter for shooting in many situations where one is normally used today. When shooting with a 3-D camera rig of this invention in situations where the beamsplitter is not needed, there is no need for expensive additional lighting to compensate for light loss attributable in the past to use of a beamsplitter.

The 3-D camera rig of the present invention can use "pinhole" lenses. FIGS. 10, 11, 12a and 12b all illustrate what may be called "pinhole lenses," but are very different in design.

FIG. 10 is the original pinhole "lens" made by punching a straight pin or needle through black cardboard to make a pinhole camera, and is included for reference and completeness. However, this type of "lens" does not have the quality necessary to make it useful for a professional 3-D camera rig.

FIG. 11 is a board-level camera from approximately 0.75 to 0.25 inch square, mounted to an electrical circuit board to be integrated into security surveillance cameras and cell phones. The lens is mounted behind a very small aperture which serves much like the lens in the cardboard pinhole camera; however the lens improves focus. These board-level cameras have lenses with small apertures that provide sharp focus from infinity to only inches from the lens, and therefore do not require focusing by the user.

FIG. 12 is the type of "pinhole lens" utilized in an especially preferred embodiment of the present invention. This type of lens is typically designed with a C-mount to be used on CCTV security cameras for video surveillance and can be used on C-mount high-definition cameras, for example on the Silicon Imaging SI-2K MINI camera. These pinhole lenses are typically 3-5 inches long and have front barrel diameters well under 1 inch. The main advantages of this type of lens for a 3-D camera rig of the present invention are (1) that the entrance pupil EP is designed to be at the front surface of the lens barrel, (2) the entrance pupil is extremely small, approximately 3 mm diameter or less, and (3) the lens barrels are designed with conical tips which can be conveniently positioned close to the 45° mirror of the 3-D camera rig of FIG. 16a-c.

FIG. 13 is a door peephole lens, not an image-forming lens as are the other lenses described here, but rather is an afocal wide-angle lens adapter. This peephole lens is used in conjunction with a conventional lens, for example the CCTV lens of FIG. 9. The advantage of using the peephole lens is that its entrance pupil is very small (less than approximately 1 mm diameter) and near the front tip which allows use of a small 45° mirror as in FIGS. 15a and 15b.

A preferred embodiment of a 3-D camera rig of the present invention uses "pinhole" lenses which have been designed with the entrance pupil which is physically small (typically 3 mm diameter) and at a position in front of the glass in the lens, at a hollow conical tip at the front of the lens. The pinhole lens is a special lens designed for security and surveillance work, and not known to be used in shooting motion pictures in the motion picture or TV industries. However, the small lens barrel, tiny entrance pupil, forward entrance-pupil location, and conical shape of the front of these pinhole lenses, make pinhole lenses ideal for designing a compact 3-D camera rig because, instead of requiring a large light-sharing 45° beamsplitter, a tiny fully-reflective 45° mirror can be used at the tip of only one camera, typically a down-looking camera. The tip of the lens of the alternate forward-looking camera can be positioned very close to mirror of the reflected camera so as to provide a small minimum interaxial spacing.

The 45° mirror also has an enormous advantage in that it is essentially fully reflective. Therefore there is not the light loss that 3-D filmmakers are accustomed to when using a beamsplitter rig where the light from the scene is shared by both cameras, each camera getting approximately 50% of the light.

The use of a fully-reflective 45° mirror at the tip of the down-looking lens eliminates the traditional 45° beamsplitting mirror which reduces the light to both cameras by one T-stop. This light loss, when using beamsplitter rigs, required filmmakers to either open the lens apertures one T-stop, undesirably reducing depth of field, or to double the light on the scene. Doubling the light on a scene is no small problem. Twice the light required doubling the lights themselves, and also the generator trucks, the heat on the actors, and the cost of production. This one-T-stop light loss of beamsplitter-type 3-D rigs has been the biggest objection by producers, directors and cameramen to the use of beamsplitter 3-D rigs.

Although a preferred embodiment of the present invention utilizes two lenses in a substantially 90° relationship with the fully-reflective mirror being at 45°, there is nothing magic about the 90° orthogonal relationship between cameras. That angle could be 86°, 91° or anything that gets one lens out of the way of the other lens. 90° keeps the rig design simple. Correspondingly, the mirror does not necessarily have to be 45°, but it will be half the angle between the two camera lenses, i.e. 43° if the cameras are at 86° to each other. Also, while the mirror is stated as being "fully reflective," one skilled in the art will recognize that a mirror may not reflect 100% of light perfectly, but that such a mirror is still considered to be "fully reflective."

When two pinhole lenses are used in a 3-D camera rig according to the present invention one camera is typically fixed or stationary (typically the down-looking camera) while the other camera (typically, the forward-looking camera) is laterally adjustable to increase or decrease the amount of stereoscopic depth. Because small-diameter pinhole lenses form a small entrance pupil out in front of the glass, the tip of the lens barrel typically has a conical shape. When two such lenses are used together, one facing forward, and the other orthogonal (typically, facing downward) so that the entrance pupils of both lenses can be physically close to each other, the close spacing is facilitated by the conical tips not interfering with each other. A conical geometry of the tip and the small entrance pupil also allow a fully reflective 45° mirror to be located at the tip of the vertical lens so that the reflected position of its entrance pupil is beside and close to the entrance pupil of the forward-looking camera, which also means that only a small area of the mirror is needed. Indeed, the reflective area needed for such a mirror has been calculated to be less than 1% of the equivalent reflective area on the beamsplitter of a conventional beamsplitter 3-D camera rig of FIGS. 2a-c or 3a-c.

To ensure proper positioning of the mirror, light-emitting diodes ("LEDs") can be located below the mirror, aimed upward into the down-looking camera. The mirror is adjustable laterally in its own plane until its edge just blocks the LED light to the lens. This assures that the mirror fully covers the field of view of the down-looking lens.

To ensure proper position of the forward-looking camera to determine the minimum interaxial spacing, additional LED's are located to shine horizontally on the occluding edge of the adjustable mirror. The forward-looking camera is then adjusted laterally (changing its interaxial spacing relative to the stationary down-looking camera) until it no longer sees the illuminated edge of the mirror. This minimum interaxial spacing will vary for different lenses due to the angular field of view.

FIGS. 14a and b are of a dual camera 3-D rig using a fully reflective first-surface mirror and cameras fitted with compact lenses CCTV-L. FIG. 14a is the front view showing the down-looking reflected camera RC seeing an image reflected upward into the camera lens by mirror M. The mirror is shown as small as possible to cover the field of view of the lens. Forward-looking camera DC is shown beside the mirror M, spaced as closely as possible to the mirror. However, because of the physical size of the lenses, and the depth DEP of the entrance pupils EP in the lenses, the minimum interaxial spacing IAX is too large (2.3 inches) for a general purpose 3-D camera rig. A 12-inch ruler is shown for reference.

FIGS. 15a-b are of a dual camera 3-D rig using a fully-reflective mirror and cameras fitted with compact lenses CCTV-L and peephole lenses PEEP-L. The small size of the entrance pupils EP in the peephole lenses, and up-front position of the entrance pupils EP allows a small mirror M to be used, which allows a narrow minimum interaxial spacing IAX.

FIGS. 16a-c are of a compact dual-camera 3-D rig, a subject of this invention, which makes use of pinhole lenses PNHL, of FIG. 12b, and mirror M. This rig does not use the light robbing beamsplitter BS shown in FIGS. 2 and 3. This rig uses pinhole lenses PNHL (FIG. 12b) with a small 45° mirror mounted very close to the tip of the pinhole lenses. This mirror can be very small due to the entrance pupil of the lens being positioned at the front of the lens, and aided by the conical shape of the front of the lens barrel. Advantages are (1) twice the amount of scene light reaching both cameras, compared to beamsplitter rigs, (2) the beveled tip of the lens, (3) the ability to have a small minimum interaxial spacing, and (4) large depth of field and sharply focused images due to the small entrance pupils. This camera rig provides the same interaxial and convergence adjustment range as the much larger beamsplitter rig (shown in FIG. 2 or 3a-c, and 4a-c) and of the convergence distance (shown in FIGS. 5a-c), but provides independent adjustment between the interaxial and convergence settings.

Although the advantages of a 3-D rig using pinhole lenses according to the present invention are numerous, such lenses are not readily available with different focal lengths, and they have not yet been accepted for use by the film industry. Accordingly, it is still desirable to improve on use of existing 3-D rigs that do not use pinhole lenses.

At the present time, the overwhelming vast majority of 3-D rigs do not use the side-by-side camera configuration shown in FIG. 1. There are at least two reasons for this. The first is sheer bulk of the unit, making it rather unwieldy. The second is the problem of obtaining smaller interaxial spacing due to the physical interference of camera bodies.

Instead of using the side-by-side camera configuration, the majority of 3-D rigs at the present time use a down-looking camera configuration for obtaining a reflected view camera shot from a reflected view camera RC relative to a direct view camera shot from a direct view camera DC. What is called the "down-looking" camera in the industry need not actually be looking down, but can also be looking up, or at an angle, all of which are included within the definition of "down-looking" camera for purposes of the present invention, although the most common configuration, which appears to be especially preferred, is when the angle formed between a centerline of the direct view lens of camera DC and a centerline of the reflected view lens of camera RC is substantially ninety degrees.

The critical component of the down-looking camera configuration is that the reflected view camera RC is at some angle relative to the direct view camera DC such that while the direct view camera DC can obtain a direct shot, the reflected view camera requires some means of reflection to obtain the reflected view shot which is combined with the direct shot to obtain a stereoscopic shot. The traditional means of providing such reflection to reflected view camera RC is a beamsplitter, as shown in FIGS. 17 and 18, which also illustrate an especially preferred embodiment of the down-looking camera configuration.

When a beamsplitter is used in a down-looking camera configuration, cameras DC and RC photograph rectangular images, and the light rays from the scene to the cameras' lenses use trapezoidal portions of the 45° beamsplitter. When the interaxial spacing is small there can be almost complete overlap between the trapezoidal areas for each lens on the beamsplitter. However, there are situations when the lenses are separated with an interaxial spacing that increases stereoscopic depth and where there is no overlap between the areas on the beamsplitter used by each lens.

FIG. 18 illustrates an interaxial spacing, IAX-N, in which a direct view active optical area OAA-DC of the beamsplitter BS that would be used by the direct view lens of direct view camera DC and a reflected view active optical area OAA-RC of the beamsplitter BS that would be used by the reflected view lens of reflected view camera RC overlap each other in overlap area OA.

FIG. 19 illustrates an interaxial spacing, IAX-W, in which direct view active optical area OAA-DC does not overlap reflected view active optical area OAA-RC. Because there is no such overlap, a beamsplitter is not required to obtain a stereoscopic shot, and beamsplitter BS has been replaced with clear glass CG and mirror M formed as an integral piece for ease of use (although CG and M need not be integral and could be separate pieces). By using clear glass of the same angle, thickness and refractive index as the beamsplitter which it replaces, the height of the optical center line of the camera DC is preserved, as when using the 50/50 beamsplitter. Glass CG has a fully-reflective mirror coating on one end under the reflected camera and is clear in the remaining portion in front of the direct camera. In this situation, both cameras DC and RC receive 100% of the scene light (again recognizing that a "fully-reflective" coating need not necessarily reflect 100% of the light striking it, although such a coating would still be considered "fully-reflective" or "100% reflective" to a person skilled in the art).

As an alternative to using clear glass CG in front of direct view camera DC, the clear glass can be completely removed. However, because dual-camera beamsplitter rigs are traditionally laid out taking into account the offset OFS (see FIG. 22) of the transmitted camera's optical centerline through the beamsplitter due to the refraction at the front and back surfaces of the beamsplitter, in such a situation, a spacer S can be used to adjust direct view camera DC by raising it a slight amount (e.g., approximately 1 mm), to restore the sight line for that camera. Of course, if the dual-camera rig is laid out using the assumption that it will never require a narrow interaxial spacing requiring use of a beamsplitter, spacer S can be eliminated.

Because most 3-D shots are taken with an interaxial separation of more than 1.5 inches, techniques described herein can be used to obtain a stereoscopic shot without use of a beamsplitter when the camera rig uses small-format cameras, when using lenses with a small front diameter so as to not physically touch where a beamsplitter would normally be used, when using lenses with an entrance pupil near the front of the lens so as to use as small an area of the beamsplitter as possible, when using normal to telephoto lenses, as well as when one is shooting with a very wide interaxial spacing.

A 3-D rig according to the present invention has a great many advantages over traditional beamsplitter rigs. Most importantly, it has no T-stop light loss as with beamsplitter rigs.

While the invention has been described herein with reference to certain preferred embodiments, those embodiments have been presented by way of example only, and not to limit the scope of the invention. Additional embodiments thereof will be obvious to those skilled in the art having the benefit of this detailed description. Further, modifications are also possible in alternative embodiments without departing from the inventive concept.

Accordingly, it will be apparent to those skilled in the art that still further changes and modifications in the actual concepts described herein can readily be made without departing from the spirit and scope of the disclosed inventions as defined by the following claims.

What is claimed is:

1. An apparatus for stereoscopic photography, comprising:
   a support;
   a direct view camera with a direct view lens, said direct view camera being mounted to the support for obtaining a direct view camera shot;
   a reflected view camera with a reflected view lens, said reflected view camera being mounted to the support in a down-looking camera configuration, for obtaining a reflected view camera shot relative to the direct view camera shot; and
   means for obtaining the reflected view camera shot without use of a beamsplitter when an interaxial spacing between the direct view camera and the reflected view camera does not cause an overlap between a direct view active optical area of the beamsplitter that would be used by the direct view lens and a reflective active optical area of the beamsplitter that would be used by the reflected view lens;
   wherein the means for obtaining the reflected view camera shot is comprised of:
      a reflective planar mirror positioned to reflect light from a surface of said reflective planar mirror to the reflected view lens, said reflective planar mirror having a first surface; and
      a transparent planar glass positioned to allow light to pass substantially through the transparent planar glass to the direct view lens, said transparent planar glass having a second surface substantially parallel to the first surface.

2. The apparatus of claim 1, wherein an angle formed between a centerline of the direct view lens and a centerline of the reflected view lens is substantially ninety degrees.

3. The apparatus of claim 1, wherein the first surface of said reflective planar mirror is substantially fully reflective of light.

4. The apparatus of claim 1, wherein the reflective planar mirror is integral with the transparent planar glass.

5. The apparatus of claim 1 wherein neither the direct view lens nor the reflected view lens is a pinhole lens.

6. A method for stereoscopic photography, comprising:
   using a direct view camera with a direct view lens, said direct view camera being mounted to a support, for obtaining a direct view camera shot;
   using a reflected view camera with a reflected view lens, said reflected view camera being mounted to the support in a down-looking camera configuration, for obtaining a reflected view camera shot relative to the direct view camera shot without use of a beamsplitter when an interaxial spacing between the direct view camera and the reflected view camera does not cause an overlap between a direct view active optical area of the beamsplitter that would be used by the direct view lens and a reflected view active optical area of the beamsplitter that would be used by the reflected view lens; and
   combining the direct view camera shot and the reflected view camera shot to obtain a stereoscopic image;
   wherein the reflected view camera shot is obtained by using:
      a reflective planar mirror positioned to reflect light from a surface of said reflective planar mirror to the reflected view lens, said reflective planar mirror having a first surface; and
      a transparent planar glass positioned to allow light to pass substantially through the transparent planar glass to the direct view lens, said transparent planar glass having a second surface substantially parallel to the first surface.

7. The method of claim 6, wherein an angle formed between a centerline of the direct view lens and a centerline of the reflected view lens is substantially ninety degrees.

8. The method of claim 7 wherein neither the direct view lens nor the reflected view lens is a pinhole lens.

9. The method of claim 6, wherein the first surface of said reflective planar mirror is substantially fully reflective of light.

10. The method of claim 6, wherein the reflective planar mirror is integral with the transparent planar glass.

* * * * *